May 8, 1928.  1,668,978
G. RHINEVAULT
HOSE FASTENING DEVICE
Filed Nov. 29, 1926
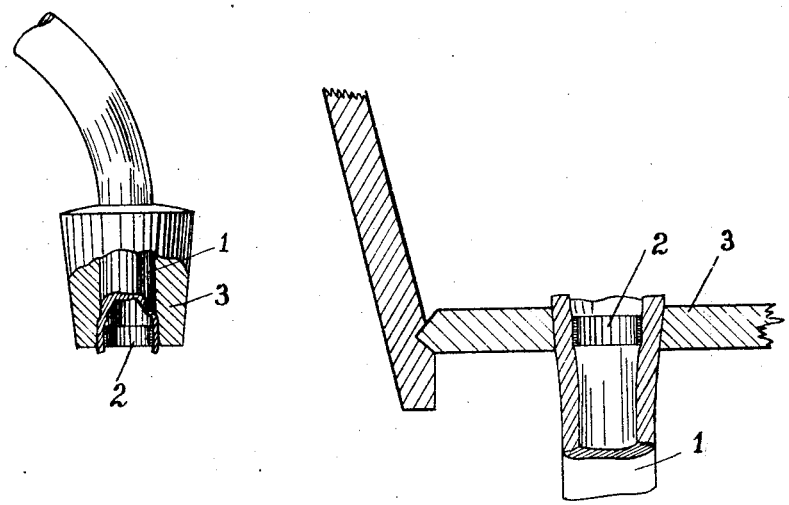
FIG 1.
FIG. 2.
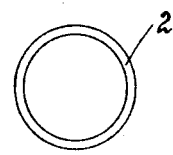
FIG. 3.
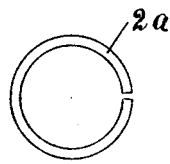
FIG. 4.
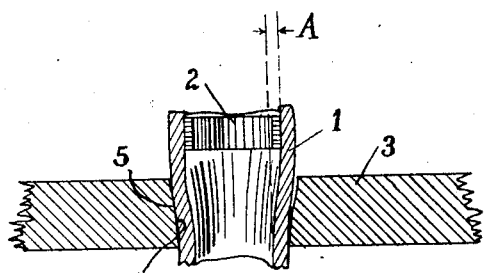
FIG. 5.
INVENTOR
GLENN RHINEVAULT
BY
George B Willey ATTORNEY Patented May 8, 1928.

1,668,978

UNITED STATES PATENT OFFICE.

GLENN RHINEVAULT, OF SAGINAW, MICHIGAN.

HOSE-FASTENING DEVICE.

Application filed November 29, 1926. Serial No. 151,497.

This invention relates to an improved means for fastening a flexible tube into an opening such as a bored hole in the bottom or wall of a tub or a pail, or in a perforated stopper or bung made of wood or other suitable material and fitting the bung hole of a cask, barrel or other vessel.

The object of the invention is to provide a simple and inexpensive means for producing a tight joint between a flexible tube and the walls of a hole or opening, preferably counterbored and tapered, in the body to which the tube is affixed. The said means, such as a bushing, is adapted to perform its function of making a tight joint and a secure anchorage for the tube by merely being inserted in the end of the tube to expand it, the tube then being drawn through the opening until the expanded part engages in a countersunk or flared part of the hole.

A further purpose of my invention is to provide, as a simple and inexpensive article of manufacture a suitable ring or bushing whereby a hose end can be expanded and tightly anchored in a bung or stopper by being received in a hole of the stopper. By means of the ring the expanded end within the hole is prevented from collapsing.

With the above and certain other objects in view, which will appear later in the specifications, my invention comprises the devices described and claimed and the equivalents thereof.

In the drawings Fig. 1 is a side view, partly in section, showing a flexible hose secured to an apertured stopper by means of my invention.

Fig. 2 is a similar view, showing the manner of connecting a flexible tube to the bottom of a tub.

Fig. 3 is a plan view of a cylindrical bushing.

Fig. 4 is a plan view of a modified form of bushing, being a split ring.

Fig. 5 is a sectional view of the device applied to a tube and in position to be drawn with the tube into tight engagement with the body to which it is secured.

As is clearly shown in the drawings, numeral 1 indicates a flexible tube or hose, in the end of which is received a bushing 2 for expanding the tube end. The body 3 to which the tube is attached may be a stopper, as shown in Fig. 1, or a tub bottom, as shown in Figs. 2 and 5. The body 3 is formed with a hole 4 of proper size to slidingly receive the tube 1. The hole has an end counterbored and preferably tapered to a slight outward flare, as shown at 5, to receive the expanded end of the tube when the latter is drawn taut through the hole 4, and its end is tightly fitted to the body 3, as for illustration, from the position indicated in Fig. 5 to that shown in Fig. 2.

The bushing 2 is of slightly greater outside diameter than the inside diameter of tube 1, as indicated at A, so as to properly expand the end of the tube.

Preferably the bushing is in the form of a closed ring, as shown in Fig. 3, or if desired it may be a split ring, as shown at $2^a$ in Fig. 4.

Having thus described my invention, what I claim and desire to secure by Letters Patent is:

1. In combination, a flexible tube, a bushing comprising a cylindrical ring received in an end of said tube for expanding the same, a body formed with a hole to slidingly receive said tube, the wall of said hole near one end thereof counterbored and flared to receive the expanded end of said flexible tube and adapted to form a tight joint when said tube is drawn lengthwise into engagement therewith.

2. In combination with a body having an aperture, a tube of flexible material slidingly received in said aperture, a bushing in an end of said tube, said bushing of cylindrical shape and of slightly greater external diameter than the internal diameter of said flexible tube which is thereby expanded, the walls of said aperture formed at one end with a counterbore to partly receive the expanded end of said tube, said tube adapted to form a tight joint with said counterbored walls when drawn lengthwise, for the purposes set forth.

In testimony whereof I affix my signature.

GLENN RHINEVAULT.